UNITED STATES PATENT OFFICE.

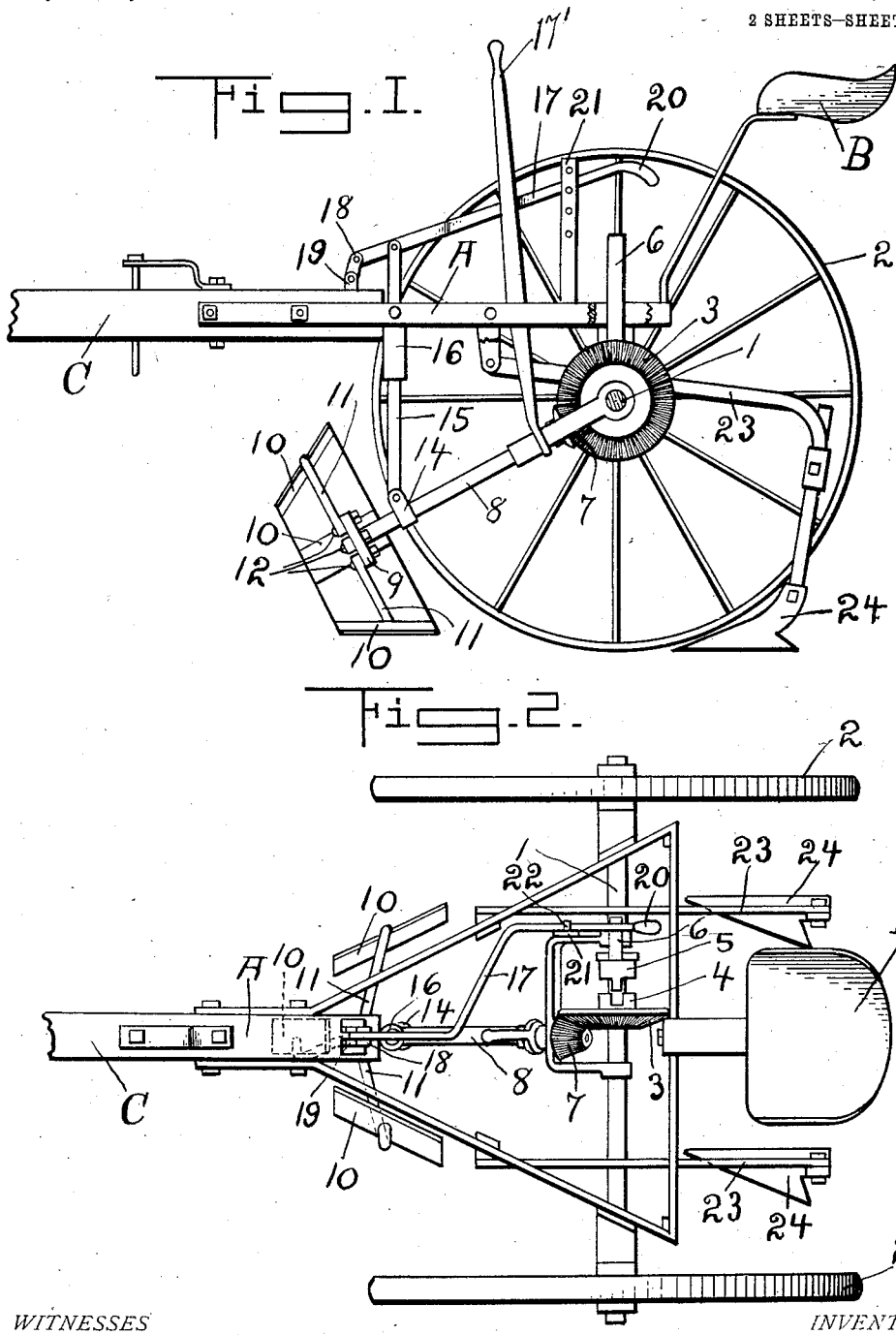

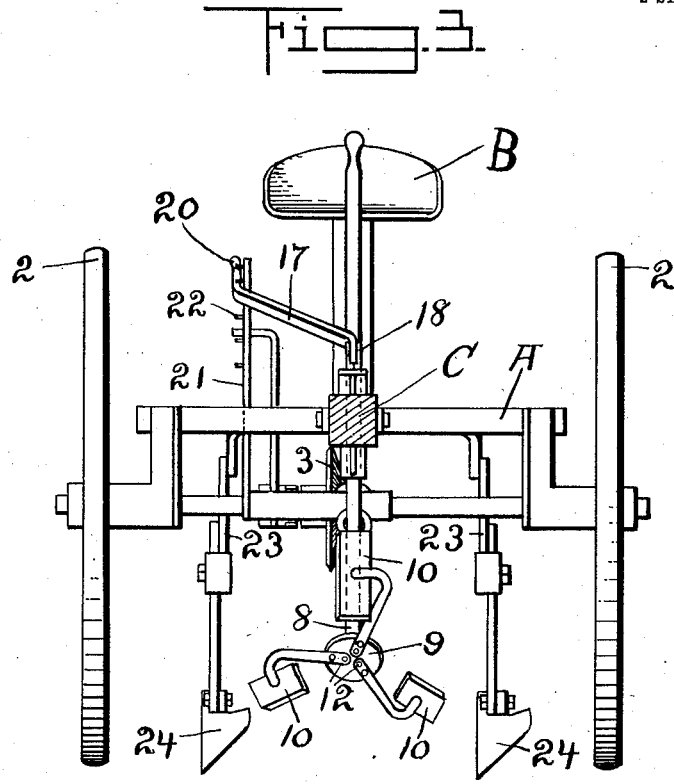
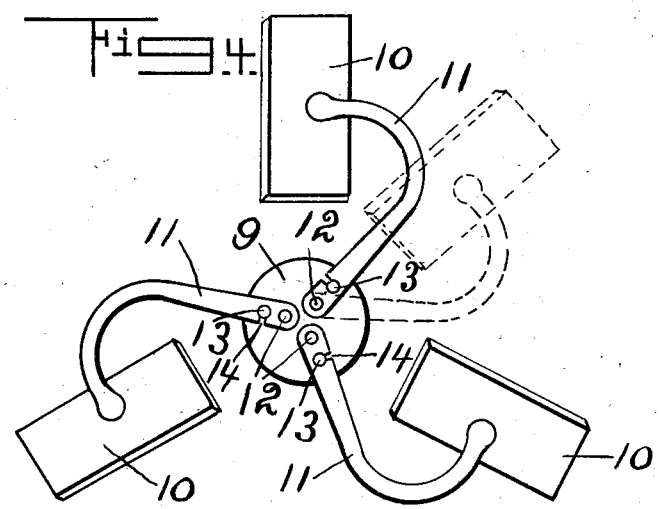

PERRY C. GALLAWAY, OF ERICK, OKLAHOMA.

COTTON-CHOPPER.

1,049,841.

Specification of Letters Patent.

Patented Jan. 7, 1913.

Application filed April 1, 1911. Serial No. 618,310.

*To all whom it may concern:*

Be it known that I, PERRY C. GALLAWAY, citizen of the United States, residing at Erick, in the county of Beckham and State of Oklahoma, have invented new and useful Improvements in Cotton-Choppers, of which the following is a specification.

This invention relates to certain novel and useful improvements in cotton choppers.

In carrying out my invention, it is my purpose to provide an implement of the type referred to wherein the chopping mechanism may be thrown into and out of chopping operation, as desired, and furthermore the hoes or chopping devices may be raised and lowered when deemed necessary.

It is also my purpose to provide such an implement with a number of hoes or choppers which are secured to a common disk or head in such manner that the blades or hoes may yield when striking an obstacle such as a stone, rock or stump, this yielding obviating the possibility of the blades or choppers being broken or otherwise damaged.

Another object of my invention is to provide an implement or machine which embodies in its construction the desired features of simplicity, durability and strength, and it is further my purpose to construct a machine which may be manufactured and marketed at a relatively low cost.

With the above recited objects and others of the similar nature in view my invention consists in the construction, combination and arrangement of parts set forth in and falling within the scope of the appended claims.

In the accompanying drawings; Figure 1 is a view partly in side elevation, partly in section of a machine embodying my invention; Fig. 2 is a top plan view; Fig. 3 is a front view; Fig. 4 is a detail view of the head or disk and the hoes or cutters carried thereby.

Referring now to the accompanying drawings the letter A designates the frame of the machine as an entirety.

B indicates the seat and C the tongue or draft bar of the chopper. Carried by the frame is the axle 1 supporting the ground or traction wheel 2—2. Mounted upon the axle, is a beveled gear 3 having a clutch collar 4, it being understood that the gear with the collar is loosely or rotatably mounted upon said axle. The axle furthermore carries a clutch member 5 splined or slidably mounted thereon, so that such clutch member rotates with the axle, and adapted to be thrown into and out of engagement with the clutch collar 4 through the medium of the lever 6 within easy reach of the operator. By such arrangement the gear 3 may be placed in and out of driving connection with the axle when desired. Meshing with this bevel gear 3 is the bevel pinion 7 carried at one end of the forwardly extending shaft 8, the front end of said shaft carrying a circular disk or head 9 to which are secured the hoes or choppers of the machine. The construction of the head and choppers is more clearly shown in Fig. 4.

The chopping hoes or blades are each indicated at 10 and are preferably approximately rectangular in form, and have the usual cutting or chopping edge. Each blade is provided with an arm 11 suitably curved or formed to obtain the required angle of cutting action, and said arms are bolted or otherwise secured through the medium of bolts 12 to the head 9 at approximately the center thereof. Near to the periphery or edge of the head I provide bolts 13, one for each arm, each arm being slotted at 14 to engage with the bolt.

Should the hoes or cutters, in the operation of the machine, strike a rock or other obstacle the slot engaging with the bolt permits the arm to move or yield relatively to such bolt thereby avoiding injury to the hoes. The pinion 7 has connected thereto a vertically disposed lever 17' adapted to be operated with the purpose of stopping the revolution of the hoes or blades 10. When it is desired to stop the revolution of the hoes or blades 10, as for instance in places where the cotton is very thin the lever 17' is operated to slide the pinion 7 rearwardly out of mesh with the gear 3.

In order to raise and lower the chopping mechanism at will, I connect to the shaft 8, as at 14 one end of the vertical rod 15, said rod extending to its sleeve 16 carried by the frame. Fulcrumed on this rod is a lever 17 having one end connected as at 18 to the vertical stud or support 19 located in front of the vertical rod, the said lever extending rearward toward the driver's seat and being provided with a handle 20 which may be operated by the driver to raise or lower the chopping mechanism. The numeral 21 designates a bar extending alongside of the lever and having a number of stops or projections 22 suitably spaced apart, and beneath which the lever may be placed, said stops catching the lever and holding the same against movement and consequently maintaining the chopping mechanism at a predetermined distance from the surface of the ground.

The numerals 23—23 designate the cultivator beams extending rearward beneath the frame of the machine, said beams carrying the ordinary cultivator shovels or plows 24—24. These cultivator beams and plows may be raised or lowered, and adjusted in any preferred manner, but this forms no part of the present invention.

From the above description taken in connection with the accompanying drawings the construction and operation of my invention will be readily apparent. When it is desired to use the machine, the clutch lever is shifted to throw the sliding clutch member into engagement with the clutch collar of the bevel gear on the axle. The latter is now in rotatable engagement with the shaft or axle, and as the latter turns the gear will drive the bevel pinion 7 at the end of the shaft 8 of the cutting mechanism, consequently revolving said shaft and imparting a rotary movement to the cutter head and to the hoes or blades carried thereby. Should it be desired to prevent the rotation of the hoes or cutters it is only necessary to disconnect the clutch mechanism. Likewise to raise or lower the cutter the lever 17 is operated from the driver's seat in order to elevate or lower the shaft 15.

It will be noted that I have provided a simple, yet durable and efficient machine which embodies in its structure, both a cotton chopper and a cultivator. Furthermore the machine comprises but relatively few parts, and those of such a nature that the liability of the machine becoming easily injured or damaged, and thereby rendered inoperative is greatly reduced.

While I have herein shown and described one particular embodiment of my invention, I wish it to be understood that I do not limit myself to all the precise details of construction set forth and modifications and variation may be made without departing from the invention or exceeding the scope of the claims. Furthermore I wish to state that the use of the cultivator shovels may be dispensed with and the machine operated merely as a cotton chopper.

What I claim is:

1. In a machine of the class described including supporting means, a shaft thereon, a head carried by the said shaft, a plurality of arms secured at their ends near the center of the head at one side thereof, bolts socketed in the said head adjacent the edge thereof and adapted to normally lie within the slots formed in the arms, and a blade carried by each of the said arms.

2. In a machine of the class described, the combination with a frame, of chopping means supported thereon including a shaft, a circular disk supported by the said shaft, a plurality of movable curved arms freely pivoted to one side of the said disk adjacent the center thereof, a blade carried by each of the said arms at one end thereof, a plurality of bolts carried by the disk and disposed immediately above the pivots of the said arms, and the said arms being formed to provide transverse slots adjacent their opposite ends and adapted to normally engage the said bolts substantially as and for the purpose described.

In testimony whereof I affix my signature in presence of two witnesses.

PERRY C. GALLAWAY.

Witnesses:
   L. O. GALLAWAY,
   T. J. COFFEY.

---

Copies of this patent may be obtained for five cents each, by addressing the " Commissioner of Patents, Washington, D. C."